United States Patent Office 2,765,222
Patented Oct. 2, 1956

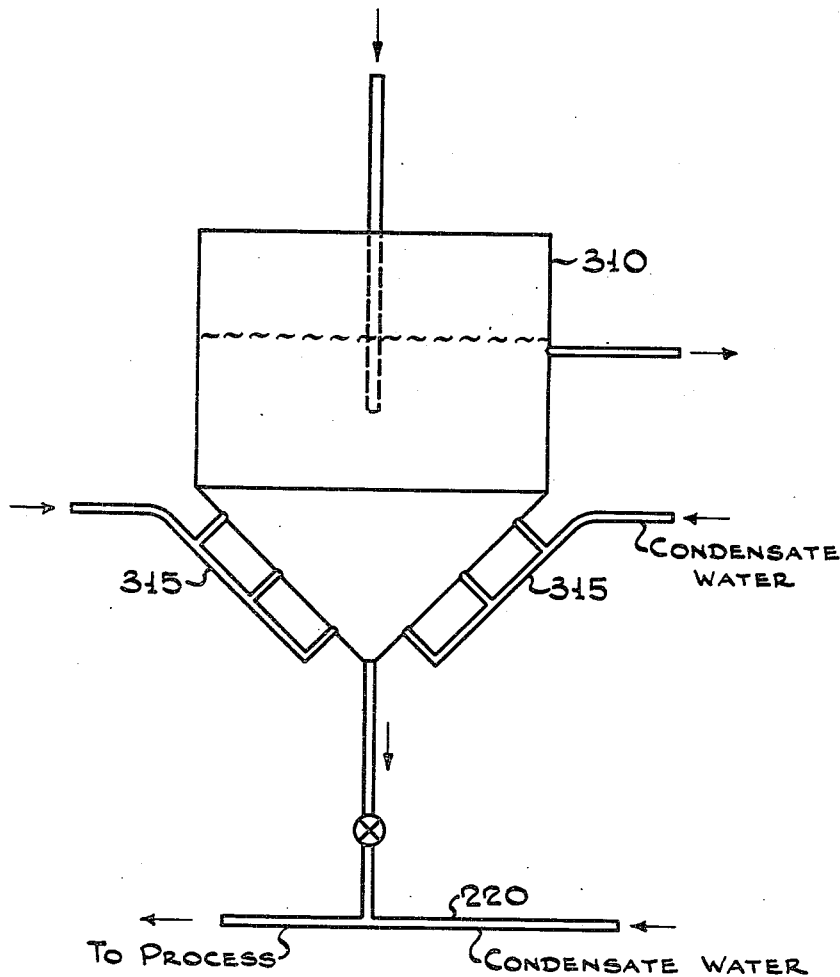

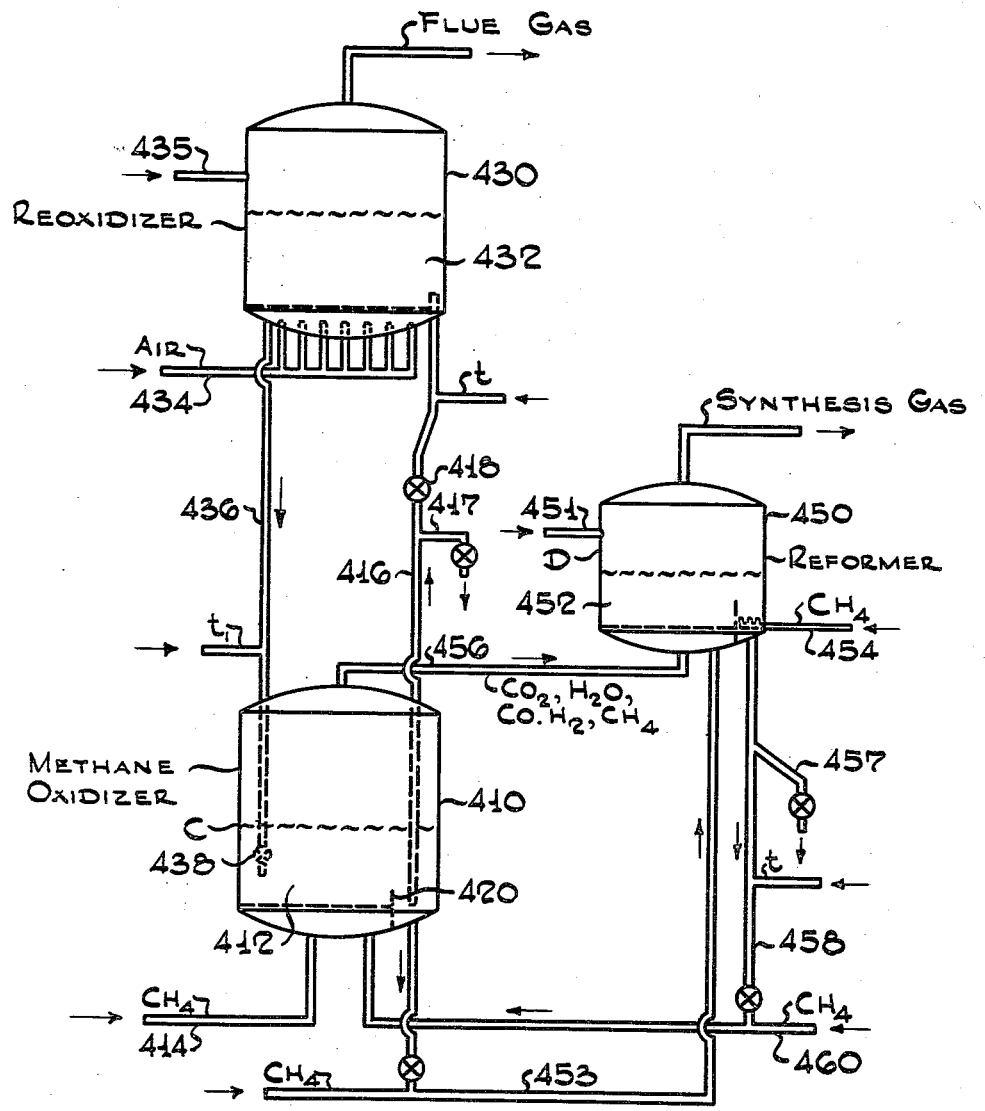

2,765,222

PRODUCTION OF GAS MIXTURES CONTAINING CARBON MONOXIDE AND HYDROGEN

Homer Z. Martin, Cranford, and Frank T. Barr, Summit, N. J., assignors to Esso Research and Engineering Company, a corporation of Delaware Original application April 2, 1946, Serial No. 659,041. Divided and this application December 15, 1951, Serial No. 261,896

4 Claims. (Cl. 48—196)

This application is a division of Serial No. 659,041, filed April 2, 1946, and now abandoned, for "Oxidation Process."

This invention relates to the oxidation of gaseous hydrocarbons such as natural gas, methane, or the like. More particularly, the invention is concerned with the oxidation of such gaseous hydrocarbons by means of metallic oxides to form mixtures of hydrogen and carbon monoxide suitable for the catalytic synthesis of hydrocarbons.

The use of metallic oxides as the source of oxygen in the oxidation of gaseous hydrocarbons has been proposed before. Experience has shown that when the reaction is conducted by passing the hydrocarbons through a fixed bed of the heated metallic oxide, the extent of the reaction is difficult to control as a result of the excess of oxygen which is available for reacting with the incoming feed and the poor distribution and transfer of heat throughout the solids bed. The reaction usually proceeds until the oxidation reaches its farthest stage to form exclusively carbon dioxide and water instead of the desired lower oxidation products such as oxygenated organic compounds or mixtures of carbon monoxide and hydrogen. This difficulty can be avoided by the use of certain metal oxides such as zinc oxide which have relatively low oxygen vapor pressures. However the use of these oxides generally involves other serious disadvantages such as low sublimation or melting temperatures. Attempts have been made to overcome these difficulties by suspending controlled amounts of finely divided metal oxides in a specific volume of gaseous hydrocarbon to be oxidized and passing this suspension through a reaction zone at controlled reaction conditions. While this method avoids some of the drawbacks of fixed bed operation new difficulties arise particularly in the manufacture under pressure of mixtures of carbon monoxide and hydrogen suitable for the hydrocarbon synthesis.

The hydrocarbon synthesis, particularly its high pressure modification carried out in the presence of iron catalysts has assumed considerable importance in recent years because of its relatively high yields of anti-knock motor fuels. An efficient and economic operation of this process requires the production and supply of the synthesis feed gas at about the pressure at which it is converted in the synthesis reaction. Production of synthesis gas by the oxidation of methane with metal oxides under pressure involves the regeneration of the reduced metal oxide by oxidation with air. When metal oxides suspended in the reacting gas are used for this reaction they must be separated from the gaseous reaction product, reoxidized in a separate regeneration zone and returned to the reaction zone. The regeneration zone must either be operated at the same pressure as the reaction zone or finely divided solids must be conveyed from a low pressure zone to a high pressure zone. In the first case, large volumes of air required for regeneration have to be compressed to the reaction pressure which is a highly expensive procedure. In the latter case special pressurized means of conveyance are required which, particularly when pressures of about 100 pounds per square inch, or above are used, involve high investment cost and considerable operating difficulties. The present invention overcomes these difficulties and affords various additional advantages, as will appear from the following description thereof read with reference to the accompanying drawing which shows semi-diagrammatic views of apparatus adapted to carry out preferred embodiments of the invention.

It is therefore the principal object of our invention to provide an improved process for oxidizing hydrocarbon gases with the aid of finely divided metal oxides at a controlled rate of reaction.

A further object of our invention is to provide an improved method of converting methane with the aid of finely divided metal oxides into gas mixtures containing carbon monoxide and hydrogen.

A more specific object of our invention is to provide a process of the type specified which will permit oxidation of the hydrocarbons and regeneration of the metal oxide at different pressures without requiring substantial compression of air or complicated conveying means for powdered solids.

Other and further objects and advantages will appear hereinafter.

In accordance with one embodiment of the present invention, finely divided metal oxide of a suitable oxygen partial pressure is maintained within a treating zone in the form of a dense bed of solids fluidized by small amounts of an aerating gas to form a well defined upper level and to exert a pseudo-hydrostatic pressure on its base. Controlled amounts of finely divided metal oxide of a suitable oxygen partial pressure are passed under the pseudo-hydrostatic pressure of said dense bed to a reaction zone through which the gases to be oxidized flow continuously at a superficial velocity sufficient to carry the metal oxide particles introduced into the reaction zone along in the form of a solids-in-gas suspension of a density substantially lower than the density of said dense bed. The temperature, pressure and residence time of this low density suspension in the reaction zone are so controlled as to accomplish the desired degree of oxidation. The suspension of reduced metal oxide in reaction products is passed into a separation zone from which the desired oxidation products are recovered and reduced metal oxide is returned to said dense bed.

The treating zone containing the dense bed and the connecting lines between the treating and the reaction zones may be maintained substantially at the pressure of the reaction zone. This procedure may be continued until the bulk of metal oxide in the dense bed has lost most of its oxidizing strength, whereupon the flow of solids from the dense bed to the reaction zone is interrupted, the pressure on the system is released, and air is passed upwardly through the dense bed at a temperature adapted to regenerate the metal oxide to its original state of oxidation. The superficial velocity of the air is preferably so controlled that the dense phase is maintained in a state of high turbulence resembling a boiling liquid retaining a well defined upper level from which only minor portions of the solids are entrained and carried out of the dense phase by the air stream. When the regeneration is completed the system is placed back on stream and under pressure for a new reaction cycle. Two or more systems of this kind may be provided to insure a continuous flow of the desired oxidation products. It will be appreciated that in this manner the oxidation reaction may be carried out at any desired elevated pressure without requiring the compression of large amounts of regeneration air or pressurized solids-conveying means.

We prefer to maintain relatively large amounts of metal oxide in the dense bed as compared with the amount of metal oxide suspended in the reaction zone at any one time in order to extend the duration of the reaction period between periods of regeneration. In general, the diameter of the reaction zone will be susbtantially smaller than that of the dense phase zone, say about 1/10 to 2/3, preferably about 1/3 the diameter of the latter to facilitate the formation of the low density suspension at technically feasible space velocities. The metal oxide and the gas to be oxidized are carried through the reaction zone at such a velocity that both materials are continually moving in the same direction with little or no back-mixing of the gas, and the conditions should be such that the oxidizable gas moves forward at least as rapidly as the oxide. In this manner it is possible to definitely limit the amount of oxygen which is supplied to a given quantity of the hydrocarbon gas within the reaction zone. Thus, the oxidation reaction may be controlled by simply controlling the amount of oxide which is reacted with a given amount of gas to be oxidized.

The heat balance of our process depends largely on the heats of formation of the metal oxide and hydrocarbon used as compared with the heat of formation of the desired oxidation products. For example, in the production of carbon monoxide and hydrogen from methane the heat generated by the exothermic formation of carbon monoxide is in general theoretically deficient to decompose the methane and reduce the metal oxide. Additional heat may supplied to this reaction by controlling the oxidation reaction so that small amounts of carbon dioxide and water are formed in a more strongly exothermic side reaction. However, a more preferred means of supplying additional heat of reaction is given by the strongly exothermic regeneration reaction whose heat may be transferred to the reaction zone as sensible heat of the metal oxide or by any other conventional means of heat recovery and transfer.

It is a particular advantage of our invention that the reaction and regeneration temperatures may be controlled with the greatest of ease. The reaction temperature may be maintained at an optimum level by controlling the amount of solids supplied to the reaction zone while the regeneration temperature may be readily kept within the desired range by controlling the amount of air supplied, and if necessary, by conventional cooling means contacting the dense solids phase. The oxygen content of the solids circulated to the reaction zone may be so controlled that any desired proportion of these solids may act as inert heat carriers.

According to a more specific modification of this embodiment of the invention we may use the separate reaction zone merely during the earlier stages of the production period until the oxygen concentration of the bulk of metal oxide in the dense phase zone is reduced to a level at which the danger of over-oxidation of the hydrocarbon gas is susbtantially diminished or entirely removed. Thereafter the feed gas to be oxidized may be passed directly through the dense bed of metal oxide at a rate adapted to accomplish the desired oxidation. Our invention also includes the introduction of small amounts of hydrocarbon gas into the dense phase during the regeneration period to supply additional heat or preheat for the regeneration reaction, if desired. For example, the depressurized gas obtained from the reaction zone at the end of the production period is suitable for this purpose.

The metal oxides which may be used in the present process are quite generally such oxides as have such an affinity for oxygen at the temperatures of our process that their oxygen partial pressures at equilibrium with both higher and lower stages of oxidation present are less than about 0.10 atmosphere and preferably less than 0.01 atmosphere so that substantially all the oxygen of the air used for regeneration can be bound by the lower stage of oxidation. The metal oxides should also be capable of oxidizing the hydrocarbon gas at least to carbon monoxide and hydrogen at the temperatures and pressures of the operation.

They may also have a catalytic activity for the oxidation reaction. While certain oxides which are reduced to metals, such as ferrous oxide, cuprous oxide, and the like, are useful for our process, other suitable oxides are the higher oxides of metals which are capable of forming both higher and lower oxides. Typical of these other suitable oxides are: cupric oxide, vanadium pentoxide, ferric oxide, and stannic oxide. Suitable also are mixtures of these oxides and mixtures with a suitable carrier such as kieselguhr. The use of carriers consisting of adsorbent materials for the oxide is especially advantageous in that it helps to bring the oxidizable substance and the oxide into close contact and to maintain such contact throughout the reaction zone. Suitable carriers are alumina or silica gels, bentonites, kieselguhr and the like. In addition to the pure oxides, mixtures of oxides with finely divided metal catalysts may also be used, such as a mixture of nickel with vanadium pentoxide, which may have reforming activity to convert methane with $CO_2$ formed in the process into carbon monoxide and hydrogen.

Whenever mixtures of metal oxides and reforming catalyst are used for the conversion of gaseous hydrocarbon into carbon monoxide and hydrogen in any process involving the reoxidation of the metal oxide-catalyst mixture with air, it is desirable that the solids in the methane reaction zone contain little or no reformer catalyst in the inactive oxidized state. We have found that this condition may be complied with if the oxygen bearing metal has a lower vapor pressure of oxygen than that of the oxidized reformer catalyst. For example if $Cu_2O$ is the oxide used to carry oxygen to the methane reaction zone, operation with nickel reforming catalyst will be satisfactory. The $Cu_2O$ has a vapor pressure of oxygen equal to $2.5 \times 10^{-9}$ atmospheres. This vapor pressure is sufficiently high to carry out the oxidation reaction required in the methane contactor. The nickel oxide, if formed, has a vapor pressure of about 0.001 atmosphere or greater at conditions in the reoxidizer which may be around 1700° F. for example. Thus, if nickel oxide is formed in any part of the reoxidizer it would tend to give up its oxygen to the copper metal which may be present in excess. Another metal oxide which may be used successfully in this manner is $Fe_3O_4$. In general we contemplate the use of those metal oxides whose vapor pressures of oxygen are lower than that of nickel oxide or the oxidized state of any other reforming catalyst used. A pressure of steam in the oxidizer and solids return leading to the methane reaction zone may be helpful; it may react with the reduced metal to form $H_2$ and $Cu_2O$ and the former reduces the reforming catalyst. Good results have also been obtained with mixtures of copper oxide with about 5–50% of iron oxide, to which a reforming catalyst such as nickel is added.

For the purpose of maintaining the required velocity of the oxide in the reaction zone it is desirable that the oxides be used in a powdered or granular form and that the granules be at least as small as 100 mesh. It is also desirable that not more than 25% of the mass of the oxide consist of material finer than 325 mesh. In general, it is preferred to use material within the range of 200 to 400 mesh. When using oxide particles of such dimensions the velocity within the reaction zone should be from 1 to 30 ft./sec., preferably about 2–5 ft./sec., in order to maintain a continuous forward flow of both oxide and oxidizable material without permitting extensive back-mixing of the gas. The dense metal oxide phase may be sufficiently fluidized during the reaction period by small amounts of an inert aerating gas, preferably steam. The superficial velocity of the air blown through the dense phase during the regeneration period is generally maintained between the approximate limits of 0.3–3 ft./sec., preferably about 1–2 ft./sec.

In accordance with another embodiment of the present invention a portion of the total amount of gaseous hydrocarbon used may first be reacted with a metal oxide such as copper or iron oxide to form substantial proportions of carbon dioxide and water, and, possibly also carbon monoxide and hydrogen, and the exit gas of this reaction may be reacted with the remainder of the gaseous hydrocarbon in a reforming zone in the presence of a reforming catalyst such as nickel to complete the conversion of the feed gas into carbon monoxide and hydrogen by reformation. In this case, as in the embodiment described before, the reoxidation of the metal oxide may be carried out in a separate vessel at a pressure substantially lower than that of the oxidation and/or reformation of the feed gas.

Having set forth the general nature and objects, our invention will be best understood from the more detailed description hereinafter, in which reference will be made to the accompanying drawing in which:

Figures 2 and 3 are diagrammatic views of apparatus for treating the product gases and Figure 4 is a diagrammatic view of an apparatus adapted to carry out another specific embodiment of our invention.

Figure 1:
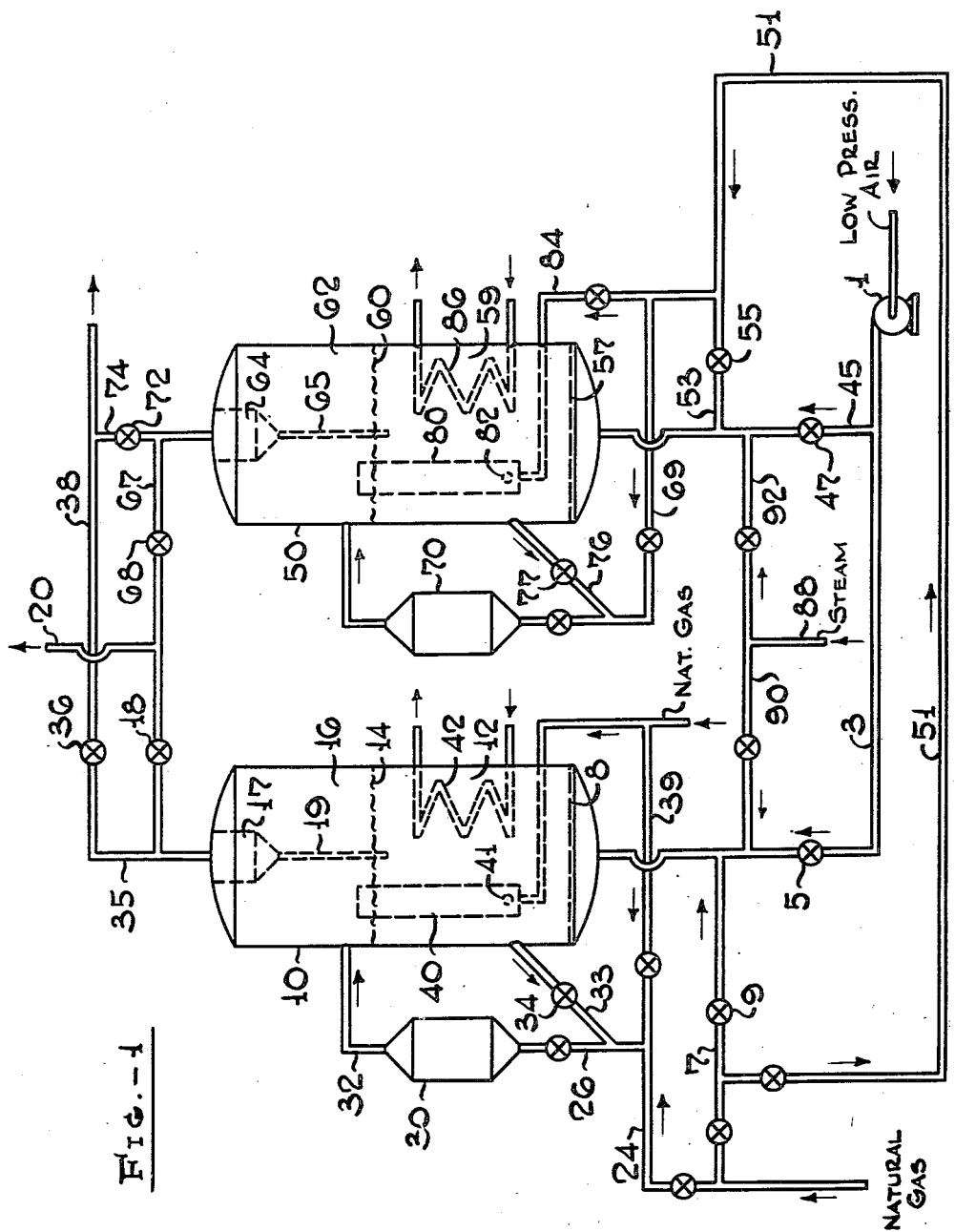
Figure 1 is a semi-diagrammatic view of apparatus suitable to practice a preferred embodiment of the invention.

Referring now in detail to Figure 1, the system illustrated therein essentially comprises two dense phase chambers, 10 and 50, each connected to a dilute phase reaction chamber, 30 and 70, respectively, and each including a reaction tube or tubes, 40 and 80, respectively, the functions and cooperation of which will be forthwith explained. While the conversion of natural gas to a mixture of carbon monoxide and hydrogen suitable as a feed gas for the catalytic synthesis of hydrocarbons will be described for purposes of illustration, it should be understood that the system is readily adaptable to other controlled oxidations of gaseous hydrocarbons.

To start up the process, air of substantially atmospheric pressure, which may be preheated to a temperature as high as about 1800° F. during the starting period is supplied by blower 1 through line 3 and valve 5 to the lower portion of chamber 10 which it enters through a perforated distribution plate or grid 8. A limited amount of a combustible gas, preferably natural gas from line 7 is added to the air to be burned and produce heat within chamber 10. A bed of finely divided metal oxide, for example, $Fe_3O_4$ or an iron ore such as hematite, having a particle size of about 100–200 mesh is arranged above grid 8 and fluidized by the upwardly streaming gases having a superficial velocity of about 1.5 ft./sec. to form in zone 12 a dense turbulent fluidized mass of solids resembling a boiling liquid and forming a well defined upper level 14. Residual air and combustion gases are withdrawn overhead from dense phase zone 12 to lose most of their entrained solids in the free space 16 above level 14 and to be vented through valve 18 and line 20. If desired, a conventional gas solids separator 17 of the centrifugal and/or electrical type may be arranged in the path of the outgoing gas and separated solids may be returned to the dense phase 12 through line 19. The amount of combustible gas introduced into chamber 10 is so controlled that the desired amount of heat is produced without appreciable reduction of the iron oxide.

When the temperature of the dense phase 12 has reached a level between about 1400° and 1800° F., preferably about 1700° F., the gas flow is halted by closing valves 5 and 9 and the gas to be oxidized, in this case natural gas, available at a high pressure, is fed through lines 24 and 26 to reaction chamber 30 which may have about ⅓ the diameter of dense phase chamber 10. The oxidation reaction of the natural gas may be carried out under an elevated pressure such as 50 to 400 lbs. per sq. in., say at about 300 lbs. per sq. in. For this purpose, valves 5, 9, 18, and 36 remain closed until the desired pressure has been built up in the system whereupon valve 36 is opened sufficiently to release gaseous products at the operating pressure. The flow of natural gas through chamber 30 is adjusted to a space velocity of about 50 to 500 v./v./hr. and a superficial velocity of about 2–5 ft./sec. Hot fluidized $Fe_3O_4$ is permitted to flow under the pressure of the dense fluidized bed in zone 12 through line 33 and control valve 34 into line 26 where it is picked up by the natural gas to form a dilute suspension which is passed upwardly through chamber 30 and returned through line 32 into chamber 10 above dense phase level 14.

The flow rate of $Fe_3O_4$ through valve 34 is so controlled that an amount of oxygen is made available which is required for the conversion into carbon monoxide and hydrogen of the amount of methane passing with the solids through chamber 30, and that the reaction temperature is kept within the approximate limits of 1400–2000° F., preferably 1500–1800° F. In general, solids flow rates of about 5.0 to 25.0 lbs. per cu. ft. of natural gas supplied at standard conditions are adequate for this purpose, using increasing rates as the cycle proceeds, so as to make up for the decreased concentration of oxygen on the fluid solids in zone 12. The flow condition in chamber 30 may be so controlled that the solids have a slightly longer residence time in chamber 30 than the gas to establish the phenomenon of mild hindered settling.

A relatively dilute suspension of reduced $Fe_3O_4$ in a mixture of carbon monoxide, hydrogen, steam and unconverted natural gas enters the free space 16 of chamber 10 wherein the superficial velocity of the gas is so drastically reduced that most of the suspended settle out and drop back into zone 12. Any solids remaining entrained may be removed in separator 17 and returned to zone 12 through line 19. Product gas is withdrawn through line 35 and valve 36 and passed through line 38 to any desired further treatment or the synthesis process.

When the oxygen content of the oxide in zone 12 has fallen beneath an operative concentration or the reaction temperature drops below the desired level, valves 34 and 36 are closed, valve 18 is opened to release the pressure to atmospheric, the flow of natural gas through chamber 30 is halted and air is again admitted through line 3, if desired, admixed with small amounts of natural gas from line 7 to reoxidize and reheat the iron oxide to the desired degree at atmospheric pressure. If the temperature during this regeneration period rises too high, heat may be withdrawn by means of cooling coil 42, to be used in any desired stage of the process. When the regeneration is complete the system is ready for a new reaction cycle as outlined above.

In accordance with another modification of our invention the reaction chamber may have the form of one or more draft tubes 40 arranged within dense phase zone 12 of chamber 10, to be used in place of chamber 30 in the following manner. Tube or tubes 40 having a diameter of from about ¹⁄₁₀₀ to ½ the diameter of chamber 10 extend from a point close to the bottom of zone 12 to a point above level 14. The upper end of the tubes is open while their lower end is provided with fixed or adjustable orifices 41 admitting only a controlled amount of fluidized solids into tubes 40. During the production period natural gas is passed through line 39 into the lower end of tubes 40 and is contacted only with the solids which are induced to flow into the draft tubes as a result of the lower suspension density in these tubes as compared with that of the dense phase 12. In all other respects the operation of tubes 40 is the same as that of reactor 30 as will be readily understood by those skilled in the art.

In order to insure a continuous flow of product gas a second system similar in construction and operation to that described above is provided to be run on production and regeneration in periods alternating with the production and regeneration periods of the system described. For this purpose air is supplied from line 3 through line 45 and valve 47 to chamber 50 during the production period of chamber 10. Natural gas may be added through lines 51 and 53 and valve 55. Chamber 50 is provided with a grid 57 which supports a dense phase 59 of finely divided oxide having an upper level 60. Gas solids separation takes place in space 62 and/or separator 64 provided with solids return line 65. Spent regeneration gas is withdrawn through line 67 carrying valve 68 and leading into line 20. Heat may be withdrawn from zone 50 by means of cooling coil 86. The operation conditions during the regeneration period are the same as those outlined in connection with the preheating and regenerating periods of chamber 10.

During the regenerating period of chamber 10, chamber 50 is switched to production by closing valve 47, 55 and 68, admitting natural gas through line 69 to chamber 70, adjusting the pressure within the system with the aid of valve 72 on line 74 and admitting controlled amounts of oxide from dense phase 59 through line 76 and control valve 77 to chamber 70. As an alternative, draft tube or tubes 80 provided with orifices 82 may replace chamber 70 using natural gas supply line 84 instead of line 69. Operation during the production period is as outlined above in connection with chamber 10 and its accessories.

The embodiment of our invention illustrated by the drawing permits of various modifications. A preferably inert fluidizing gas, preferably steam, may be introduced in small amounts into zones 12 and 59 during the production periods by way of line 88 via lines 90 and 92, respectively, in order to maintain the flow and hydraulic characteristics of the dense phases. A brief purging stage may follow each regeneration and production period using an inert gas such as steam, flue gas, etc., to prevent the formation of explosive mixtures in a manner known per se. The heat generated during the regeneration period in one chamber may be utilized to supply heat to the reaction taking place in another chamber, using any conventional heat transfer means not shown.

Cooling means may be provided to cool the hot exit gases leaving chambers 10 and 50 ahead of valves 18, 36, 68, and 72 and also ahead of separators 17 and 64 which in that case may be arranged outside chambers 10 and 50 to prevent damage to these elements by overheating and to permit the use of less expensive construction materials therefor.

It may also be desirable to scrub the gases leaving the gas-solids separators 17 and 64 from any further entrained solids fines for which purpose liquid scrubbing zones using water or any other suitable scrubbing liquid may be arranged on the path of the exit gases subsequent to the dry separation zone. Cooling and scrubbing of the exist gases may be accomplished simultaneously in these scrubbing zones. A scrubbing system particularly well adapted to this purpose as well as to recover solid fines from hot gas streams quite generally is illustrated in Figure 2.

Figure 2:
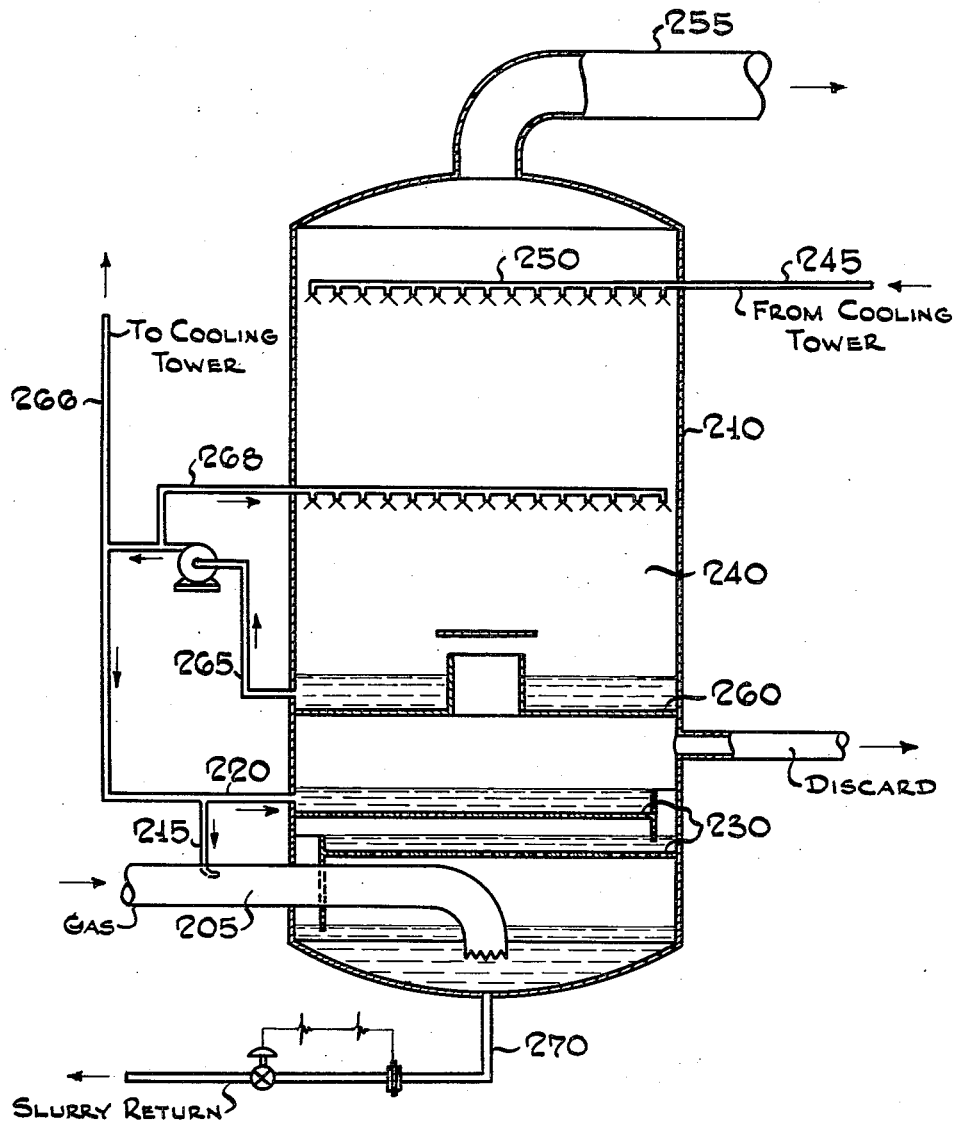

Referring now in detail to Figure 2, gases which contain powdered solids in a finely divided state and which may have a temperature of about 400°–800° F. enter tower 210 through line 205. Water may be injected through line 215 into the inlet gases, which by adiabatic evaporation cools the gases to the neighborhood of about 200°–300° F. A small quantity of water is then fed through line 220 to the top tray of a series of 2 or 3 vapor-liquid contacting zones, such as bubble trays 230 and the gases in passing countercurrently to this water are scrubbed of the dust particles which they contain. It is noted that of the water sent to the trays and into the inlet pipe, all but about ¼ vaporizes and this latter quantity is used to form the slurry by which the solids are removed from tower 210 and in which they may be returned to the process. The cooled gases leave the top scrubber tray 230 and enter a cooling zone 240. Here a much larger quantity of water at about 80° F. supplied from a cooling tower through line 245 is sprayed by sprayer 250, preferably over packing material and the gases are cooled and dehumidified leaving in a saturated condition at 100°–200° F. at the top through pipe 255. The large quantity of water used in this step is withdrawn from a tray 260 through line 265 and recycled to the cooling tower through line 266. A portion of this stream may be recycled directly to tower 210 through line 268. The relatively small quantity needed in the lower part of the tower may be taken from the stream in 265, as indicated at 220. Instead of the spray or spray plus packing, bubble plates or other suitable contacting equipment may be used in zone 240.

The main advantage of this scrubber arrangement is the separation of the large amount of water needed for the cooling job in the top part of the tower from the small amount which is desired to use for slurry formation in the lower part of the tower. The temperatures and flow rates quoted are to be considered merely as examples and not as limitations of the invention.

The apparatus described produces from the hot dust laden gases a large quantity of relatively cool and dry gases which may be used in any desired process (for example, it may be compressed conveniently) and a water slurry of convenient concentration which may be withdrawn through line 270 and returned to the process from which the solids were recovered.

If it is desired to prevent the sedimentation or adsorbtion of solid water impurities on the process solids located in number 210 a washer of the type illustrated in Figure 3 may be used to cooperate with scrubbing tower 210 of Figure 2 in the following manner.

It will be appreciated that considerable makeup water must be added to the system of Figure 2 to supply that water which is evaporated in the atmospheric cooling towers. The heat of evaporation of this water must equal the entire sensible heat removal between the hot feed gas, the cooled exit gas, and the condensed water leaving the scrubber. In accordance with the modification shown in Figure 3, no water is injected into the hot feed gas in line 205 of Figure 2 and the gas is cooled from say about 600° F. to about 230° F. by evaporation of water in the bubble trays 230. The slurry is withdrawn through line 270 as shown in Figure 2 and passed into a cone bottom vessel 310 shown in Figure 3. In this vessel the solid particles comprising the dust recovered from the gas stream, are washed by an upward rising current of pure condensate water supplied through manifolds 315. The slurry from the bottom of the cone-shaped vessel 310 is fed into a stream of condensate water in line 220 and this stream is sent back to the process relatively free of solid impurities contained in the water used in the cooling system. Sufficient makeup water of the ordinary type may be used in the cooling system to prevent deposition of dissolved particles in any part of the apparatus. The makeup water may be heated and passed through settling tanks for removal of temporary hardness if desired.

It has been mentioned above that the metal oxide used may also act as a catalyst for the oxidation reaction. It will be understood that the reaction may be further catalyzed by the addition of extraneous oxidation catalysts such as vanadium oxide, or reformation catalysts such as nickel. Reformation catalyst may be admixed with and circulated together with the metal oxide to the reaction zones, 30, 40, 70, and 80 to cause therein reformation of any $CO_2$ formed with methane to form additional amounts of CO and $H_2$.

If appreciable amounts of $CO_2$ are formed the product gas may be contacted with unconverted or freshly added quantities of methane or other gaseous hydrocarbons in the presence of a reforming catalyst in order to produce a mixture of carbon monoxide and hydrogen by the well known reforming reaction. This reaction may take place in spaces 16 and 62 above dense phase levels 14 and 60, the reforming catalyst being added to the system in a relatively small particle size so that it will remain above the bed of oxidation material, or it may be carried out in a separate vessel, methane or the like being supplied to these spaces in any suitable manner.

A system adapted to carry out this latter type of process is schematically illustrated in Figure 4. This system essentially comprises a methane oxidizer 410, a metal reoxidizer 430 and a reformer 450. Oxidizer 410 contains a dense bed 412 of metal oxide such as iron oxide fluidized by the gaseous hydrocarbon to be oxidized, such as methane, supplied through line 414. Reoxidizer 430 is arranged in an elevated position with respect to oxidizer 410 and contains a dense bed 432 of reduced metal oxide in the state of reoxidation and fluidized by air supplied through line 434. Reformer 450 may be in an intermediate position and holds a dense bed 452 of finely divided reformer catalyst such as nickel or nickel supported by vanadium pentoxide or a carrier such as kaolin, kieselguhr, magnesia or the like, fluidized by hydrocarbon gas supplied through line 453 and gaseous oxidation products from oxidizer 410, supplied through line 456. Oxidizer 410 and reformer 450 may be maintained at an elevated pressure of say about 75–200 lbs. per square inch, preferably about 100–150 lbs. per square inch, while reoxidizer 430 is preferably kept at a lower pressure, preferably at about atmospheric to 50 lbs. per square inch pressure.

Reoxidized metal oxide flows under the pressure of dense phase 432 and standpipe 436 provided with a bottom control valve 438, substantially at the temperature of bed 432, into oxidizer 410, is reduced therein by the gaseous hydrocarbon and returned through the reverse standpipe 416 provided with a top control valve 418 under the pressure of oxidizer 410 to reoxidizer 430. Control valve 418 may also be placed lower in reverse standpipe 416, in which case aeration gas is supplied to 416 through one or more taps $t$ above such lower valve, particularly during the starting period.

About 25% or more of the hydrocarbon gas to be used in the entire process of synthesis gas production may be charged to oxidizer 410 through line 414 to react with the metal oxide furnished through standpipe 436. When copper oxide is used substantially complete reaction to form $CO_2$ and water vapor results. With iron oxide some CO and $H_2$ will be formed as well. The overhead gases from oxidizer 410 are then passed into the reformer 450. In addition to the gases from vessel 410 the rest of the methane to be used in the process is also charged to vessel 450 through lines 453 and 454. Reaction between the water vapor and $CO_2$ from oxidizer 410 with the added methane results in the production of the desired synthesis gas.

One of the problems in this process is to remove the heat of oxidation from oxidizer 410 and to supply the heat required in the reformation in reformer 450. To accomplish this, oxidizer 410 is operated at a temperature higher than reformer 450, say higher by about 50–100° F. or more, and spent metal powder from oxidizer 410 may be circulated to reformer 450 to supply heat to this vessel and returned to oxidizer 410 where it absorbs the heat released in the latter vessel. As shown in Figure 4, a withdrawal well 420 and standpipe 422 for reduced metal oxide to be transferred from oxidizer 410 to reformer 450 through line 453, is located as far as possible from the end of standpipe 436 which charges the oxidized powder from the reoxidizer 430. It is one of the objects of this invention to provide a method of transferring the heat between vessels 410 and 450 while at the same time transferring as little oxidized metal as possible from 410 to 450 where combustion of CO and $H_2$ would occur. The feed to a standpipe 458, by means of which solids may be returned from reformer 450 to oxidizer 410, through line 460, may be elutriated by a stream of methane as indicated in the drawing at 454. In this way the transfer of reformer catalyst from 450 to 410 may be minimized. This transfer, while not fatal to the process in small amounts, is to be avoided so that the reformer catalyst may be kept as active as possible.

The amount of reduced metal oxide transferred from oxidizer 410 to reformer 450 should be as small as possible and should not exceed the amount required for the desired heat supply to reformer 450. In many cases, the extent of reforming to be done in reformer 450 may be relatively so small that the heat supplied by the exit gases from oxidizer 410 may be sufficient and a solids circulation from oxidizer 410 to reformer 450 may be substantially or completely dispensed with.

Operating temperatures may be about 1500°–1900° F., preferably about 1700° F., in reoxidizer 430; about 1400°–1800° F., preferably about 1600° F., in oxidizer 410; and about 1300°–1700° F., preferably about 1500° F. in reformer 450. If desired fresh metal or metal oxide may be supplied to reoxidizer 430 through line 435 and metal oxide fines of undesirably small size may be discarded through line 417. Similarly, fresh reforming catalyst may be fed through line 451 to reformer 450 and spent material withdrawn from the system through line 457. The solids flow through standpipe 436 and 458 may be facilitated by the supply of small amounts of suitable fluidizing gases through taps $t$ as indicated.

While the operation of the systems illustrated by the drawing has been described with reference to the production of carbon monoxide and hydrogen from natural gas or methane it will be understood that this system may be readily adapted by one skilled in the art to other oxidation reactions such as the production of alcohols, aldehydes, acids or other oxygenated compounds from gaseous or vaporous hydrocarbons.

Our invention will be further illustrated by the following specific example:

*Example*

For the production of about 3.50 million cu. ft. per day of hydrogen and carbon monoxide in the approximate ratio of 1.9 mols of hydrogen per mol of carbon monoxide from methane using cupric oxide having an average particle size of about 350 mesh as the oxidizing agent in a system of the type illustrated by Figure 1 the following approximate conditions have been found suitable.

| | |
|---|---|
| Feed gas composition | $CH_4=96.0\%$; $CO_2=4.0\%$. |
| Reaction temperature | 1520° F. |
| Average reaction pressure | 100 lbs. per sq. in. |
| Regeneration temperature | 1620° F. |
| $CH_4$ fed rate | 1.7 million cu. ft. per day. |
| Air feed rate | 4.5 million cu. ft. per day. |
| Solids circulation rate | 18,000 lbs. per min. |
| Superficial gas velocity in reactor | 5 ft. per sec. |
| Density of suspension in reactor | 80–120 lbs. per cu. ft. |
| Density of suspension in regenerator | 200–220 lbs. per cu. ft. |

The synthesis gas produced at these conditions has a composition about as follows:

$$H_2 = 51.0\%$$
$$CO = 27.5\%$$
$$CO_2 = 4.8\%$$
$$CH_4 = 7.6\%$$
$$H_2O = 9.1\%$$

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed is:

1. In the production of gas mixtures containing carbon monoxide and hydrogen by the oxidation of gaseous hydrocarbons essentially exclusively with finely divided metal oxides in an oxidizing zone and reoxidation of metal oxide reduced in said oxidizing zone with air in a reoxidation zone in a system operated by the fluid solids technique wherein a dense turbulent bed of finely divided metal oxide fluidized by upwardly flowing gases to resemble a boiling liquid having a well defined upper level is maintained in said reoxidation zone, the improvement which comprises supplying heat of reaction to said oxidizing zone as sensible heat of reoxidized metal oxide circulated from said reoxidation zone to said oxidizing zone and operating said reoxidation zone at a higher temperature and a substantially lower pressure than said oxidizing zone.

2. The method as claimed in claim 1 in which the gases produced in said oxidizing zone are subjected to reformation with at least one mild oxidizing agent selected from the group consisting of $CO_2$ and steam in the presence of a reformation catalyst.

3. The method as claimed in claim 1 in which said metal oxide at the reoxidation temperature has an oxygen partial pressure of less than about 0.10 atmosphere at equilibrium with both higher and lower stages of oxidation.

4. In the method of producing mixtures of carbon monoxide and hydrogen by oxidizing gaseous hydrocarbons in an oxidizing zone with metal oxides, reoxidizing reduced metal oxide with air in a reoxidizing zone and reforming gaseous hydrocarbons with gaseous products of complete oxidation of gaseous hydrocarbons in a reforming zone in the presence of a reforming catalyst, the improvement which comprises maintaining dense turbulent beds of finely divided oxidized and reduced metal oxide fluidized by upwardly flowing gases to resemble boiling liquids having well defined upper levels in said oxidizing and reoxidizing zones and a similar fluidized bed of finely divided reforming catalyst comprising reduced metal oxide in said reforming zone, operating said oxidizing zone at a pressure higher than that of said reoxidizing zone and at conditions conducive to the formation of substantial amounts of products of complete oxidation including $CO_2$ and water, maintaining a negative temperature gradient from said reoxidizing zone to said oxidizing zone to said reforming zone, supplying heat of reaction to said oxidizing zone as sensible heat of metal oxide circulated from said reoxidizing zone and heat of reaction to said reforming zones as sensible heat of reduced metal oxide circulated from said oxidizing zone, supplying gaseous hydrocarbons to said reforming zone, returning reduced metal oxide from said reforming zone to said oxidizing zone and from said oxidizing zone to said reoxidizing zone and recovering carbon monoxide and hydrogen from said reforming zone.

References Cited in the file of this patent

UNITED STATES PATENTS

| | | |
|---|---|---|
| 1,899,184 | De Simo | Feb. 28, 1933 |
| 1,957,743 | Wietzel et al. | May 8, 1934 |
| 2,425,754 | Murphree et al. | Aug. 19, 1947 |
| 2,631,094 | Seymonds | Mar. 10, 1953 |

FOREIGN PATENTS

| | | |
|---|---|---|
| 10,759 | Great Britain | of 1887 |
| 12,155 | Great Britain | of 1892 |